Dec. 9, 1930.  P. SCHANO  1,784,253
FOLDABLE COPY STAND FOR PORTABLE TYPEWRITERS
Filed Sept. 18, 1930  2 Sheets-Sheet 1
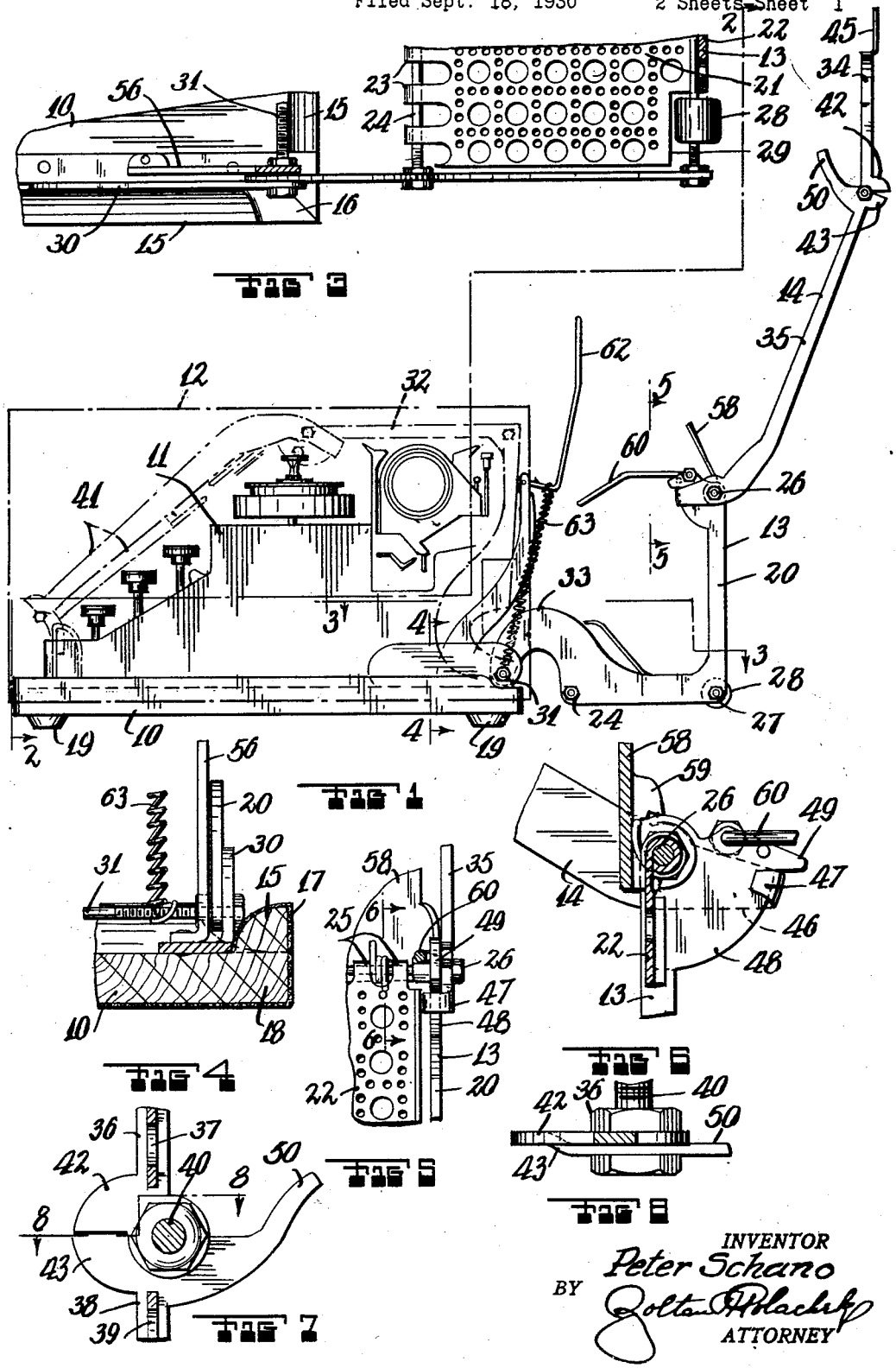
INVENTOR
Peter Schano
BY Zolta H Hlacsik
ATTORNEY

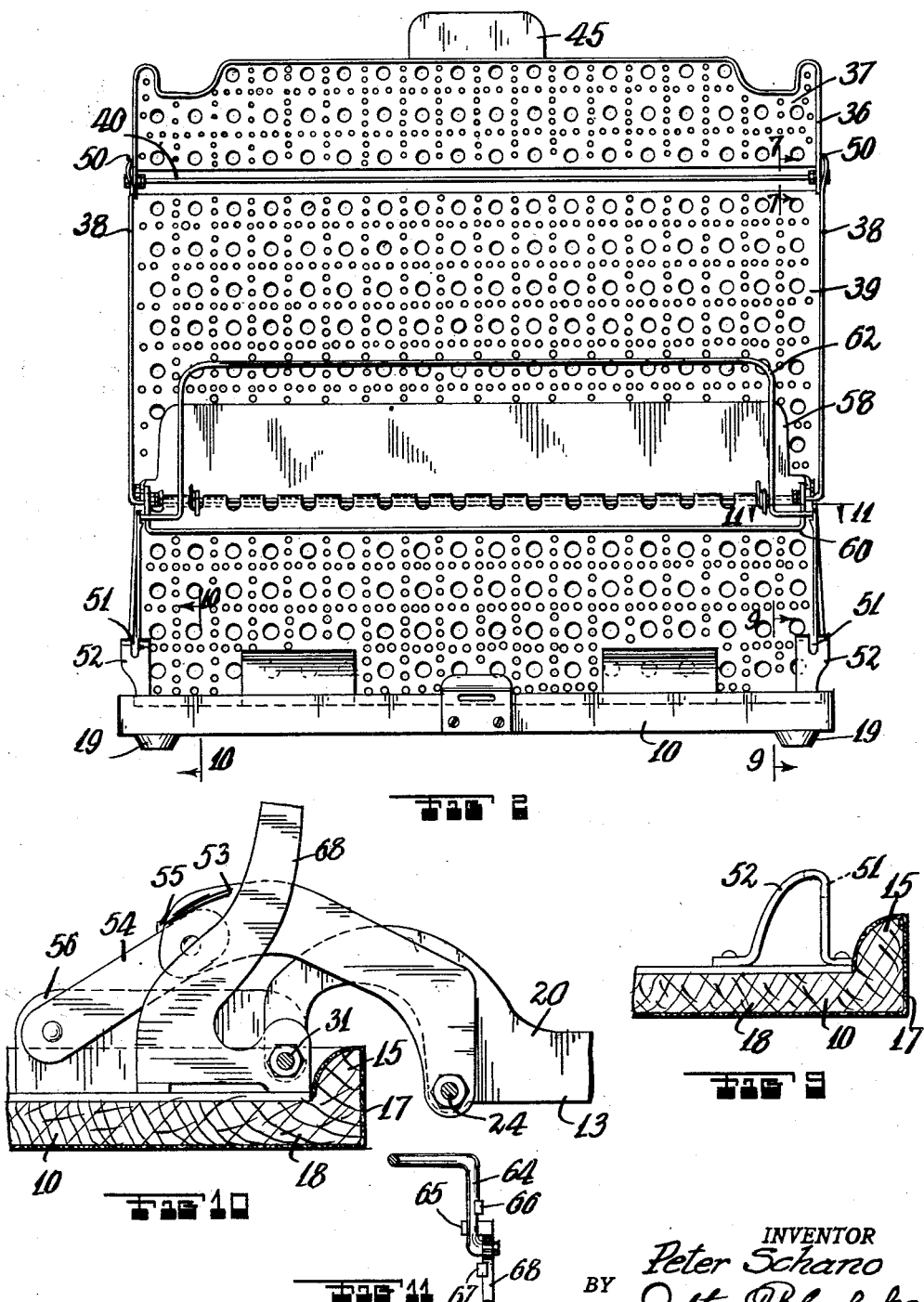

Patented Dec. 9, 1930

1,784,253

UNITED STATES PATENT OFFICE

PETER SCHANO, OF UNION CITY, NEW JERSEY

FOLDABLE COPY STAND FOR PORTABLE TYPEWRITERS

Application filed September 18, 1930. Serial No. 482,656.

This invention relates to new and useful improvements in a foldable copy stand and cover for portable typewriters.

The invention has for an object the provision of a foldable copy stand and cover for portable typewriters which is adapted to be attached upon the base of the valise for carrying the typewriter and to fold to cover the portable typewriter and to unfold for supporting a copy.

The invention has for a further object the provision of two main members to constitute said foldable copy stand and cover, said main members comprising a bottom member and a top member, the top member to pivotally connect with the bottom member so as to move substantially 90° from a vertical position partially covering the portable typewriter to a horizontal position resting upon the same support on which the base member rests, and the top member to pivot substantially 60° relative to the bottom member to assume a 30° rearward inclination to the vertical when the bottom member is in the horizontal position for holding a copy, and to assume a position substantially 30° downwards below the horizontal when the bottom member is in the vertical position so as to act as a cover for the case of the typewriter.

The invention has for a further object the provision of a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is an end elevational view of a device constructed according to this invention shown with the typewriter in place.

Fig. 2 is an elevational view of the device per se without the typewriter, looking in the direction of the line 2—2 of Fig. 1.

Fig. 3 is a fragmentary enlarged horizontal sectional view taken on the line 3—3 of Fig. 1.

Fig. 4 is a fragmentary enlarged sectional view taken on the line 4—4 of Fig. 1.

Fig. 5 is a fragmentary enlarged sectional view taken on the line 5—5 of Fig. 1.

Fig. 6 is a fragmentary sectional view taken on the line 6—6 of Fig. 5.

Fig. 7 is a fragmentary enlarged sectional view taken on the line 7—7 of Fig. 2.

Fig. 8 is a fragmentary horizontal sectional view taken on the line 8—8 of Fig. 7.

Fig. 9 is a fragmentary sectional view taken on the line 9—9 of Fig. 2.

Fig. 10 is a fragmentary enlarged sectional view taken on the line 10—10 of Fig. 2.

Fig. 11 is a fragmentary horizontal sectional view taken on the line 11—11 of Fig. 2.

The foldable copy stand and cover for portable typewriters comprises a base 10 for supporting a portable typewriter 11 and for connection with a cover indicated by the dot and dash lines 12 to constitute a valise for carrying the typewriter 11, a bottom member 13 pivotally connected on the rear edge of the base 10 for moving from a vertical position covering a portion of said typewriter 10 to a horizontal position resting on a flat element on which said base 10 is placed, a top member 14 pivotally connected with said bottom member 13, means for limiting pivoting of the top member relative to the bottom member so that the top member may assume a position rearwards from the vertical in the horizontal position of the bottom member 13 for supporting a copy and downwards from the horizontal in the vertical position of the bottom member 13 for covering the keyboard of the typewriter 11, and means for holding a copy on said top member 14.

The base 10 is flat and of rectangular form in plan view, and is formed with raised marginal edges 15. The rear corners of the base have the marginal raised edges cutout, as indicated by reference numeral 16 in Fig. 3, so as to allow the pivotal connection between the bottom member 13 and the base member. Cloth, leather or the like material 17 covers a wooden form 18 which together constitutes the base member 10. At the corners and at the bottom side of the base member 10 a plurality of rubber feet 19 are attached so as to cushion the device when it is resting on some surface. The portable typewriter 11 may be of any conventional design and construction such as is generally sold on the market at the present time. The dot and dash lines 12 indicate a cover for engagement upon the base 10 for forming a valise. Such cover and base is generally known in the art and for this reason details of these parts will not be given.

The bottom member 13 is of L shape when viewed in end elevation, and comprises at its ends L shaped end brackets 20 connected with a horizontal bottom perforated member 21 and a vertical perforated member 22. The free edge of the horizontal perforated member 21 is turned around as indicated by reference numerals 23 and engaging a bolt 24 which extends completely across the part, and connects with the end brackets 20 to constitute the connection between the end bracket and the horizontal perforated member 21. The free top of the vertical perforated member 22 has its ends also turned down as indicated by reference numeral 25 for receiving a bolt 26 which extends completely across it and at the ends connects with the end bracket 20 for constituting the connection between the end brackets and the vertical perforated member 22. A bolt 27 is engaged through the corner of the L shaped bracket 20 and supports rollers 28 arranged in cutouts 29 formed in the members 20 and 22 so that when the bottom member 13 is in the horizontal position, these rollers rest upon the same surface as the feet 19.

The pivotal connection between the bottom member 13 and the base 10 is accomplished by brackets 30 attached upon the ends of the base, and supporting a transverse bolt 31 which also engages through the ends of the bracket 20 accomplishing the pivotal supporting. In Fig. 1 dot and dash lines 32 indicate the vertical position of the bottom member 13, while the full lines indicate its horizontal position. It should be noticed that in the vertical position the perforated member 22 will extend over a portion of the top of the typewriter 11 to cover this portion, while the member 21 will engage across the rear side. The pivoted bottom ends of the brackets 20 have curved portions 33 so as to present portions which act against the base 10 when the bottom member 13 is in the vertical position to limit pivoting of the member to this position. The bottom member may be pivoted outwards from this position to the horizontal one, shown in full lines in Fig. 1.

The top member 14 consists of an upper section 34 pivotally connected with a lower section 35. The upper section 34 consists of a frame 36 supporting a perforated sheet 37. The lower section 35 comprises end bars 38 attached upon the ends of a perforated sheet 39. The pivotal connection between the upper and lower sections 34 and 35 respectively is accomplished by a bolt 40 which extends completely across the sections and engages through the lower ends of the frame 36 and the upper ends of the bars 38.

A means is provided for limiting the relative pivoting of the sections 34 and 35 to positions so that the outer section 34 is in line with the inner section 35, or in which the outer section 34 is flat against the inner section 35. This collapsed condition of the device is shown in Fig. 1 by the dot and dash lines 41. The means for limiting the pivoting comprises lugs 42 projecting from the bottom ends of the frame 36 and in the vicinity of the pivot point of the sections and engageable against lugs 43 projecting from the bars 38. The lugs 43 are bent into the plane of the lugs 42, as may be clearly seen from an inspection of Fig. 8. A handle 45 projects from the top of the top section 34 for manual manipulation thereof.

The pivotal connection of the top member 14 with the bottom member 13 is accomplished by the said bolt 26 which extends through the top ends of the brackets 20 and through the bars 35. The means for limiting the pivoting of the top member 14 relative to the bottom member 13 so that it may move to positions before defined comprises portions 46 constituting the bottom ends of the bars 38 and on the opposite sides of the pivot point 26, and having bent tips 47 engaging against curved projections 48 from the brackets 20. The curved projections 48 are concentric with the pivot point 26 and of an arc of substantially 60°. A top stop 49 at the top of the curved projection limits this end so that the bent portion 47 may not disengage but acts against it as a stop. When the top section 34 of the top member 14 is aligned with the bottom section 35 and the top member is in the position as shown in full lines in Fig. 1, the device is capable of supporting a copy so that the typist may read the copy and type accordingly. Dot and dash lines 41 in Fig. 1 indicate the top section 34 of the top member 14 folded upon itself and then pivoted around upon the pivot point 26 so as to cover the case of the typewriter.

A means is also provided for holding the top section 14 when in the position indicated by the dot and dash lines in this position, that is, in an inclined position across the keyboard of the typewriter and this means comprises fingers 50 projecting from the bars 38 and of curved form as shown in Fig. 1 and partially engageable in openings 51 formed in the corners of brackets 52 attached upon the base 10. These brackets comprise strips of metal bent at the center constituting the high point and having their ends attached upon the base 10.

A means is also provided for limiting the bottom member 13 from pivoting lower than the horizontal even when not supported by the same supporting surface upon which the feet 19 rest. This means comprises a pair of links 53 and 54 respectively at one of the ends of the base 10 and pivotally connected with each other, and one of the links being provided with a stop 55 engageable against the side of the other link to limit their pivoting. The outer ends of the joined links are respectively connected with the brackets 20 and with brackets 56 attached upon the base member 10. In Fig. 10 the links are shown holding the member 13 in the horizontal position. To move the member to the vertical position, it is necessary to collapse the links 53 and 54 upwards about their connected pivot point.

The means for holding a copy on the top member 14 comprises a plate 58 extending completely across between the bars 38 and at the ends being formed with lugs 59 pivotally connected upon the bolt 26. This allows the plate 58 to assume a position shown in Fig. 1 so that a copy may be placed between the plate and between the perforated sheet 29 and then the plate moved back against the copy. To supplement the holding a frame 60 is provided which comprises merely a bent piece of wire pivotally mounted at the ends upon the lugs 49. This frame may be also pivoted upwards against the copy which is to be held.

A means is also provided for aiding in the unfolding of the top member 14 from the dot and dash position shown in Fig. 1 to the open position shown in full lines. This means comprises a frame 62 pivotally mounted at its ends upon the brackets 56, and a spring 63 acts between the frame 62 and the bolt 31 so as to normally urge the frame upwards into the vertical position shown in full lines in Fig. 1. This is so in that the frame 62 is formed with an offset bottom end 64 against which the spring 63 acts. The offset ends 64 also engage against lugs 65 from the brackets 56 so as to limit pivoting of the frame 62 to the vertical as shown in Fig. 1. When the frame 62 is pivoted into the horizontal position, a lug 66 upon the offset 64 acts against the lug 67 upon the bracket 68 limiting pivoting in that direction. At all times the spring 63 acts to again pivot the device to the open position. While the fingers 50 are engaged in the openings 51, the spring 63 cannot move the top member 14 to the unfolded position, and it is only when the fingers 50 are disengaged from the openings 51 that the unfolding takes place.

The operation of the device may be traced by assuming it in the position shown in Fig. 1. A copy may be placed between the plate 58 and the perforated member 39 and then the plate 58 and the frame 60 moved against the copy to help maintain it in place. Gravity also acts to maintain the position of the copy in that the top member 14 is inclined rearwards from the vertical at an angle of substantially 30°. To cover the typewriter 11 or to fold the copy holder so that the cover 12 of the valise may be engaged in place to carry the typewriter away, it is merely necessary to first pivot the top section 34 against the bottom section 35 and then to pivot the folded top member 14 down and simultaneously pivot the bottom member 13 upwards to the vertical position so that these parts assume the positions indicated by the dot and dash lines 32 and 41. The cover 12 of the valise may then be engaged in place.

While I have shown and described the preferred embodiment of my invention, it is to be understood that I do not limit myself to th precise construction herein disclosed and the right is reserved to all changes and modifications coming within the scope of the invention as defined in the appended claims.

Having thus described my invention, what I claim as new, and desire to secure by United States Letters Patent is:—

1. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical to the horizontal position of the bottom member for supporting a copy and downwards from the horizontal in the vertical position of the bottom member for covering the keyboard of the typewriter, and means for holding a copy on said top member.

2. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, and means for holding a copy on said top member, said base being provided with marginal raised edges having cutout portions for the passage of brackets which serve to pivotally connect the bottom member with the base.

3. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, and means for holding a copy on said top member, said bottom member being of substantially L shape so that in the vertical position the rear of the typewriter and a portion of the top is covered and in the horizontal position a portion of the bottom member rests upon the same support which supports the base and has a portion extending upwards for directing the top portion upwards to support the copy.

4. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, and means for holding a copy on said top member, said bottom member being of substantially L shape and comprising end brackets spaced from each other, a horizontal perforated plate connected with a vertical perforated plate between these end brackets, and bolts engaging turned edges from the perforated plate and the brackets to hold the parts together.

5. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, and means for holding a copy on said top member, said bottom member being of substantially L shape and comprising end brackets spaced from each other, a horizontal perforated plate connected with a vertical perforated plate between these end brackets, and bolts engaging turned edges from the perforated plate and the brackets to hold the parts together, another bolt being extended through the corners of the L shaped brackets and support rollers for acting against the surface which supports the base.

6. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, and means for holding a copy on said top member, said bottom member including end brackets formed with curved bottom ends so that portions of the brackets act against said base to limit pivoting of the bottom member upwards to the vertical position.

7. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, and means for holding a copy on said top member, said bottom member including end brackets formed with curved bottom ends so that portions of the brackets act against said base to limit pivoting of the bottom member upwards to the vertical position, and a means being also provided for limiting pivoting of the bottom member downwards to the horizontal position.

8. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, and means for holding a copy on said top member, said top member being made of an upper section pivotally connected with a lower section.

9. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, and means for holding a copy on said top member, said top member being made of an upper section pivotally connected with a lower section, said sections including perforated sheets extending substantially across their full lengths.

10. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, and means for holding a copy on said top member, said top member being formed of an upper and a lower section pivotally connected, and a means for limiting relative pivoting of these sections from a position in which the sections are in end aligned contacting relations to a position in which they are flat against each other.

11. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, means for holding a copy on said top member, and means for holding the bottom member and the top member in the positions covering said typewriter.

12. A foldable copy stand and cover for portable typewriters, comprising a base for supporting a portable typewriter and for connection with a cover to constitute a valise for carrying the typewriter, a bottom member pivotally connected in the rear edge of said base for moving from a vertical position covering a portion of said typewriter to a horizontal position resting on a flat element on which said base is placed, a top member pivotally connected with said bottom member, means for limiting pivoting of the top member relative to the bottom member so that the top member may assume a position rearwards from the vertical in the horizontal position of the bottom member for supporting a copy and downwards from the horizontal in the vertical position of the bottom member for covering the keyboard of the typewriter, means for holding a copy on said top member, and means for holding the bottom member and the top member in the positions covering said typewriter, comprising a plate pivotally connected upon the pivot point of the top member with the bottom member and a frame pivotally connected across the top portion of the bottom member.

In testimony whereof I have affixed my signature.

PETER SCHANO.